3,161,226
PRESSURE CONTROL MEANS FOR FLAME CUTTING TORCHES
Fred Stoneberg, 646 N. Laramie Ave., and Raymond Dorweiler, 2714 W. Bilden Ave., both of Chicago, Ill.
Filed Nov. 16, 1960, Ser. No. 69,630
5 Claims. (Cl. 158—27.4)

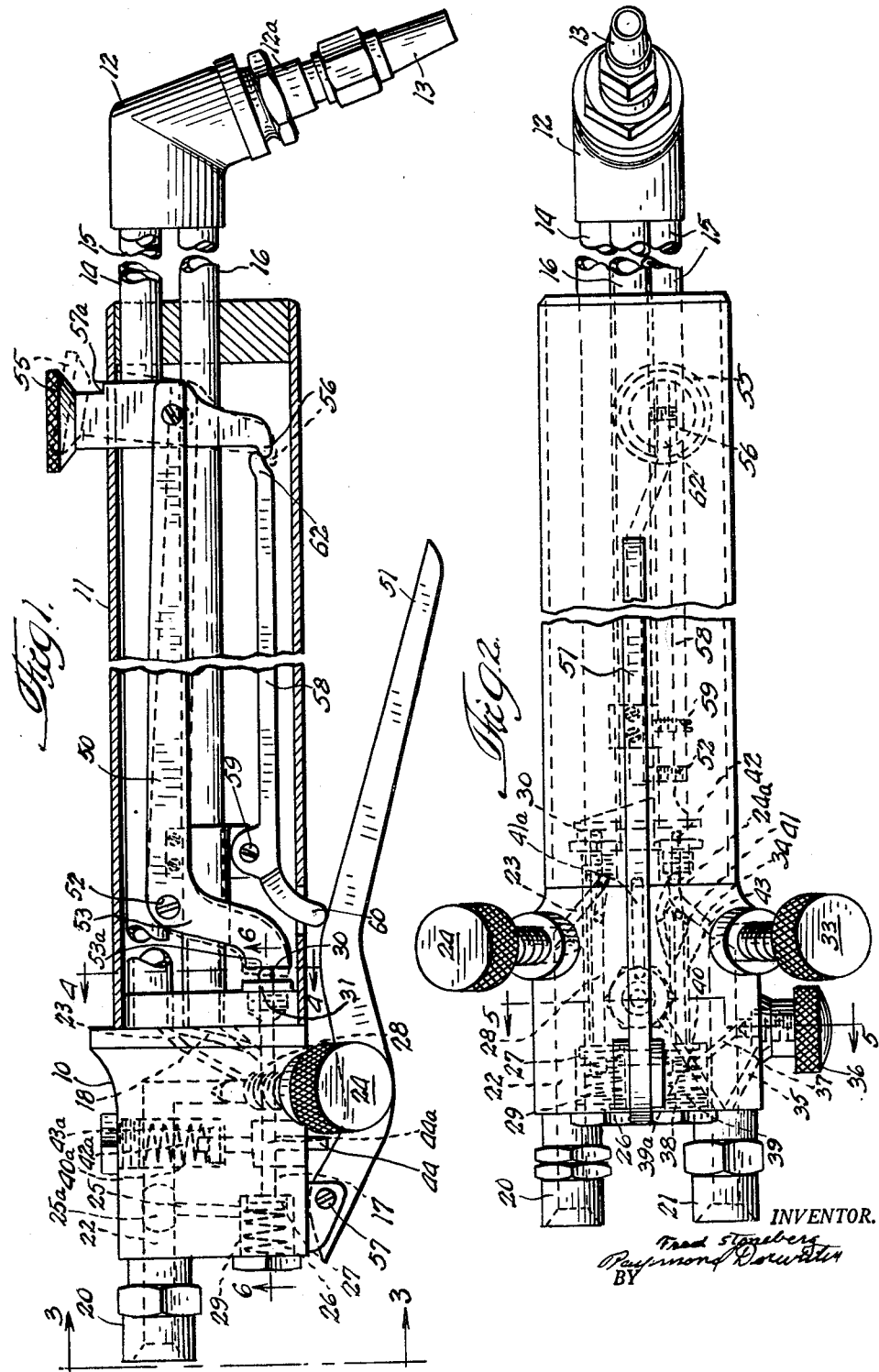

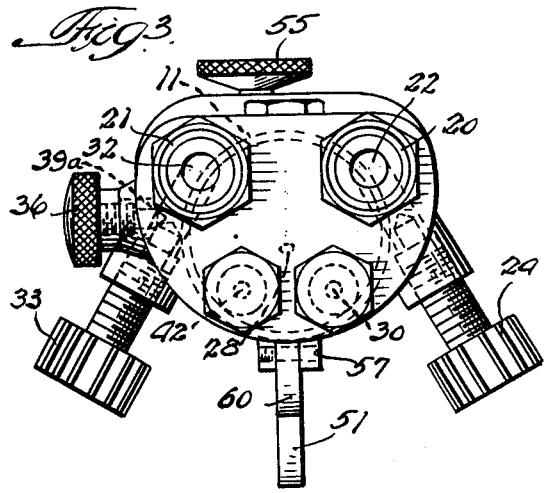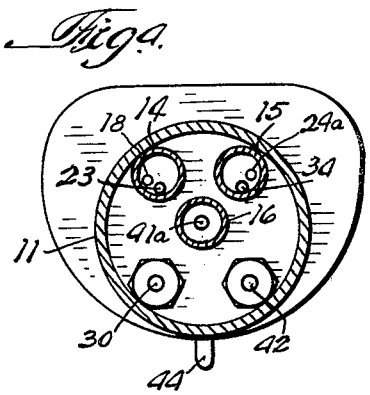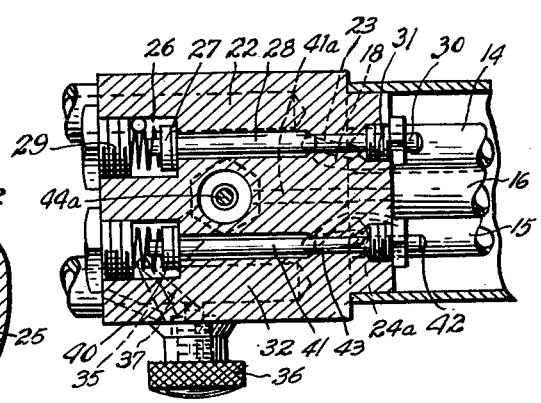

Our invention relates to improvements in the design, construction and operation of torches useful in the flame cutting of metals. In particular, the invention provides an improved flame cutting torch and a novel pressure regulation and gas flow control system for selectively controlling the pressure and flow of gases supplied to the torch.

In the conventional use of hand and machine torches for flame cutting, the torches are designed to utilize fuel gas, e.g. acetylene, propane or other combustible gas, and oxygen from tanks or cylinders at relatively high pressure for both combustion and for cutting. In ordinary torches, the oxygen and fuel gas are supplied at a constant tank pressure preset by a pressure type flow regulator associated with the supply tank. The pressure may be further adjusted by means of hand valves associated with the oxygen and fuel gas inlet pipes.

Usually, the pressure is of the order of 100 to 125 p.s.i.g. for the oxygen supply and 20 to 50 p.s.i.g. for the fuel supply, designed to provide, or approximate, a neutral flame for maximum heat during the preheating cycle. Additional oxygen for the cutting cycle is also made available at the regulated oxygen supply pressure through a separate line. Conventionally, the pressures are pre-set and the mixture is adjusted by manual set valves. Usually lever means for switching from the preheat cycle to the cutting cycle is provided.

Operation with the combustion gases near or at the tank supply pressure is desirable for rapid and effective preheating, but is unnecessary for cutting, once preheating has been accomplished. Obviously, such operation is highly wasteful of fuel and oxygen and in addition, at the high temperatures obtaining, results in excessive tip consumption. Although conventional torches are ordinarily equipped with hand valves to permit adjustment of pressure (as well as mixture ratio) in the gas lines, the necessary adjustment is troublesome, time consuming and may be difficult to attain with the accuracy necessary for effective flame control. As a consequence, operators rarely attempt regulation by adjustment of valve settings to obtain optimum operation, in terms of pressure or mixture, as they switch from the metal preheating to the flame cutting cycles.

In recognition of this problem, injection type torches have been designed in order to promote efficiency of fuel utilization which regulate flow of fuel gas by the volume and rate of flow of oxygen. The difficulty with such injection type torches, however, is that during the preheating cycle, the pressures (or flow) of combustion oxygen and fuel gas are so low that protracted heating times are required as a preliminary to cutting. For example, a period of ½ to 1½ minutes is customary in comparison to 4 to 10 seconds using flow at normal regulated tank pressures. The protracted preheating time over the usual work period results in excessive consumption of fuel gas, despite reduced combustion oxygen pressure, and also in significant additional cost, because of increased tip consumption, slower production rates, design complexity, and the like.

It is an object of the invention to provide an improved flame cutting torch equipped with means for selectively regulating the pressure, flow and operation of both fuel gas and oxygen during the preheating and cutting cycles in order to reduce consumption of fuel gas and oxygen.

It is a further object to provide a torch and burner, including an improved flow regulator valve assembly which permits utilization of relatively inexpensive and readily available fuels such as propane and methane or other gases of petroleum origin. Another object is to reduce preheating time by improvement in control of the pressure and flow of combustion gases in a manner permitting speedup of production rates and, concomitantly, tip savings resulting from cool operating tips.

According to the invention, a flame cutting torch is provided which includes a tube or similar suitable conduit for delivering fuel gas to a mixing head associated with a burner discharge tip, a tube for delivering combustion oxygen gas to the mixing head, and a tube for delivering cutting oxygen gas to the discharge orifice of the burner tip. A flow conduit with an associated control valve is provided for supplying fuel gas at high pressure, for example, at normal regulated tank supply pressure, preferably regulated for optimum preheat rate, from a fuel inlet channel (or port) to the fuel gas delivery tube. A separate valved flow conduit is provided for supplying fuel gas at reduced pressure from the supply tank to the fuel gas delivery tube. Means are provided for selectively controlling flow of gases through each of said valved flow conduits. Similarly, a flow conduit with associated control valve is provided for supply of combustion oxygen gas at high (or tank pressure) to the combustion oxygen delivery tube, and a separate valved flow conduit is provided for supplying oxygen at lower pressure to said delivery tube. Means for selectively controlling flow through each of said valved conduits is provided. Advantageously, and additional flow conduit with associated control valve is provided for supplying cutting oxygen at high pressure from the oxygen inlet port (or a separate oxygen supply port) to the cutting oxygen delivery tube. The control valves are adapted for selective rapid actuation, sequentially, of first the high pressure valves in the preheating cycle and then the cutting oxygen valve. Advantageously, the low pressure valves for the combustion gases are open to flow during both the preheating and cutting cycles.

It is a special feature of the invention that the valve regulation assembly may be constructed in the form of a compact unit which may become a structural part of a 3-tube hand or machine torch, or which can be made in the form of a separate unit integrable with the burner section of such a torch. It is a further feature of the invention that the control system includes means for substantially simultaneously switching flow from the high pressure combustion gas system to the low pressure combustion gas system with the opening of the cutting oxygen valve. The result is jet action of combustion gas only as needed during the preheat cycle, but with jet action of oxygen during the cutting cycle.

The low pressure valve system advantageously may include a restrictive orifice in each conduit or passageway from gas or oxygen inlet channels to the corresponding delivery tube. Each conduit advantageously is equipped with a shut-off valve which may be an adjustable type valve, for example, a needle type valve with hand operated screw adjustment that can be preset, or regulated during operation, to vary the operating pressure for the combustion gases in the cutting cycle. The high pressure conduits including the cutting oxygen gas line, advantageously are fitted with quick acting valves, for example, of the plunger type. The latter may be equipped with lever-type handles so that by easy movment they can be pressed or snapped into the desired operative position. Preferably, the leverage action used to open the cutting oxygen valve is used to close the high pressure combustion gas valves. Thus the valve regulator system of the present invention is well adapted in application to hand torches for quick, convenient operation with one hand while the torch is held steadily in working relationship with the other hand. The operator is able to shift from the preheat cycle almost instantaneously to take full advantage of the optimum effects of different stages of the flame cutting operation.

The invention will be further illustrated by reference to the accompanying drawings which relate to a particular embodiment of the invention.

In the drawings, FIGURE 1 is an elevational view showing a cutting torch embodying the invention in partially cut-away and in partial longitudinal section.

FIGURE 2 is a plan view of the torch, partially sectionalized.

FIGURE 3 is an end elevation of the torch, as is indicated in FIGURE 1, and is in partial section.

FIGURE 4 is a sectional view across the lines 4, 4 of FIGURE 1.

FIGURE 5 is a sectional view across the lines 5, 5 of FIGURE 2.

FIGURE 6 is a horizontal section in the direction of the lines 6, 6 of FIGURE 1.

In the drawings, the cutting torch illustrated comprises a pressure control head 10, a tubular cylinder or sleeve 11, which serves as handle for the user, a mixing head 12 and a burner tip 13. The torch includes three separate gas supply tubes namely a fuel gas tube 14, a combustion oxygen tube 15 and a cutting oxygen tube 16. As indicated in the drawings the tubes are partially contained within sleeve 11 but for a substantial extent outside of it they are indicated as cut away in order to permit enlargement of working parts. The respective tubes 14, 15 and 16 are fitted to appropriate passageways (not shown) in the mixing head. The mixing head, 12–12a and burner tip assembly 13 may comprise any of the conventionally available forms and are referred to only for the sake of completeness. Since the structural and operational details thereof are not a part of the invention, they will not be further described.

Fuel gas and oxygen are supplied to the torch supply tanks or other suitable sources connected to inlet connections 20 and 21, respectively, for the fuel gas and oxygen. The fuel gas passes into fuel gas inlet channel 22 from whence it is passed via conduit 23 to fuel gas tube 14. An adjustable valve means 24 is seated in a neck of channel 22 in a manner controlling adjustably the flow of gas through conduit 23 to the fuel gas tube 14. A second conduit, or by-pass 25 originating in drilled section 25a is provided from channel 22 to valve chamber 26. Valve chamber 26 is actuated by a quick acting valve means of the plunger type comprising valve head 27, plunger stem 28 and spring loading 29. The end of the valve stem 30 protrudes from the surrounding packing gland and closure nut 31. The outlet port from valve chamber 26 comprises a cylindrical passageway 17 surrounding the stem 28. From passageway 17 fuel gas flows via conduit 18 to the fuel gas tube 14.

Oxygen flows in analogous fashion from inlet connection 21 to inlet channel 32. From inlet channel 32, the oxygen gas may flow past adjustable valve means 33, suitably a screw type needle valve, via conduit 34 to combustion oxygen tube 15. Also from oxygen inlet channel 32 a high pressure by-pass conduit 35 is provided, which may be controlled by adjustable needle valve 36. The flow of high pressure oxygen proceeds via conduit 37 to valve chamber 38. Valve chamber 39 contains a spring loaded plunger type valve, similar to that described above for the fuel gas system, comprising the valve head 40, a long plunger valve stem 41 and a protruding tip 42. Valve stem 41 reciprocates in tubular passageway 43 from which a conduit 24a connects to combustion oxygen tube 15.

From the oxygen inlet channel 32, a third flow conduit 39 provides a passageway for high pressure oxygen to the cutting oxygen valve chamber 40a from whence it may be delivered to cutting oxygen tube 16 by connecting conduit 41a as indicated in FIGS. 2, 5 and 6. The cutting oxygen valve chamber 40a is controlled by a plunger valve comprising spring loading 42a, valve head 43a, valve stem 44a and protruding tip 44. When the plunger valve is opened, oxygen flows from inlet channel 32, via conduit 39a, valve chamber 40a and conduit 41a to tube 16.

The arrangement of the gas inlet channels, the adjustable valves and the high pressure valve chambers may be seen more clearly in FIGURE 3. The control valve head or assembly may be constructed of a number of different elements enveloped in a cylindrical sleeve of sheet metal, but advantageously the control head comprises a single casting or forging of a metal such as brass or bronze which can be machined to receive the various channels, conduits and valve chambers. As indicated more clearly in FIGURES 4, 5, and 6, a compact structure is thereby provided, which can be used as an integral part of a particular hand torch or which can be supplied as a detachable control head useable with a variety of torches. FIGURES 3 to 6 inclusive illustrate the special relationship and operative structure of the inlet channels, valves, chambers and conduit passageways for gas flow. The inlet channels overlie the high pressure valve chambers and associated plunger valves. Advantageously, the connecting conduits and passageways can be machined to provide restrictive orifices in the low pressure lines and otherwise sized in accordance with design, and ordinary tank supply pressures, in a manner minimizing the need for manual adjustment, or other positive control, of the valves.

The mechanism for actuating the flow of gas selectively through the above described pressure control head 10 constitutes another aspect of the invention which has special applicability to hand operated cutting torches. As viewed in FIGURE 1, this mechanism comprises two levers 50 and 51, which with associated elements are adapted to switch the flow of gases selectively and quickly from normal flow (through the respective inlet channels for fuel gas and oxygen, 22 and 32, and the corresponding conduits 23 and 34, to the fuel gas tube 14 and the combustion oxygen tube 15 as employed during "light-up") to high pressure flow of gases for the metal preheating operation. Thus lever 50 is mounted for rotatable movement under pressure about a bolt 52 and includes yoked section 53 which is adapted under manual pressure when lever 50 is depressed to apply, via the cam-like action of said yoked section 53 by means of a pair of flat endpieces 53a thereof, simultaneously actuating pressure on the protruding tips 30 and 42 of the high pressure plunger valves of valve chambers 26 and 38. The means for depressing lever 50 comprises rotatably mounted push button 55 which is equipped with toe 56 and latchet section 57a. When depressed, the latchet 57 is locked under a portion of sleeve 11 which acts as a restraining shoulder therefore.

Lever arm 51 is advantageously large enough for easy grasping thereof and is mounted rotatably at one hand by means of a bolt 57. Associated with lever arm 51 is an additional lever arm 58 mounted by means of bolt 59. Lever arm 58 includes a finger 60 and a toe 62 which overrides the toe 56 of push button 55 when it is in the latched condition. Advantageously lever arm 51 is curved as indicated so that when it is depressed, pressure is brought first on finger 60 of lever arm 58, thereupon acting to release push button 56 and thereafter on the protruding tip 44 of plunger valve 43. When lever arm 51 is thus depressed by the operator, flow of cutting oxygen is opened via the action of valve 43 while the flow of high pressure gas and oxygen are cut off via the pressure of lever 51 on finger 60 of lever 58 and its translation downward though toe 62 thereof to toe 56 of push button 55. The button is thereby unlatched, releasing the pressure exerted through lever arm 50, yoked section 53 and end-pieces 53a on the tips 30 and 42 of high pressure valves 28 and 41.

In operation, the gas supply sources are regulated according to the available flow pressures. For example, a pressure of about 10–125 p.s.i. of oxygen may be used from an ordinary commercial supply tank of oxygen and about 5–50 p.s.i. of fuel gas, using any suitable commercial regulator, from a conventional supply source. When the burner is ignited, the needle valves 24 and 33 advantageously are operated full open. The combustion flow passages to the fuel gas tube 14 and the combustion oxygen tube 15 for the purpose may be equipped with properly dimensioned restrictive flow orifices. Advantageously, the low pressure passageways provide for a substantial pressure drop, e.g. to less than about 1 p.s.i., while balancing flow for substantially perfect combustion over a wide range of burner tip sizes. Needle valves 24 and 33 therefore normally remain full open, minimizing control effort are available to modify flame characteristics and as safety aids when shut off is required.

After the torch has been "lighted up," push button 55 is depressed as indicated according to the dotted lines shown therefore in FIGURE 1. This action actuates lever 50 and thereby forces the operative parts of yoke 53 against the protruding tips 30 and 42 of the respective high pressure fuel gas and combustion oxygen valves 27 and 40 respectively. As indicated by the dotted line position for push button 55, latchet 57a is locked by the downward bias on button 55 under the shoulder of sleeve 11 (or other advantageous latch). As a consequence, the flow of fuel gas and oxygen into the respective delivery tubes 14 and 15 is greatly increased by the opening of the spring loaded valves 27 and 40. By this technique, the desired preheat of the metal to be cut is rapidly attained, and with surprisingly reduced consumption of fuel gas. Using the torches of the invention, the preheat cycle is reduced to less than about 10 seconds ordinarily and often to less than 2 seconds.

As soon as the desired preheat has been accomplished, lever arm 51 is depressed. The action of this arm through finger 60 of lever 58 and the toe 61 thereof releases push button 55. The result is to remove the pressure from valve stem tips 30 and 42, permitting the high pressure valves 27 and 40 to close. At the same time the action of lever 51 depresses valve tip 44 which acts to open the flow of cutting oxygen from oxygen inlet 32 through valve chamber 40 to cutting oxygen tube 16.

Use of the invention provides means for designing flame cutting torches for optimum utilization of the combustion gases from the standpoint of both economy and efficiency of operation. The operator can switch almost effortlessly from the minimal pressures and consumption required for "light-up," and for the cutting step, to the high pressure flow required for rapid and economical preheating, particularly in the case of heavy metal pieces. The operator then can switch rapidly as the desired preheat is obtained back to the low pressure flow of the combustion gases while simultaneously actuating the flow of high pressure of oxygen for cutting.

Flow of oxygen and fuel gas through the low pressure lines can be set at exceedingly low and economical pressures. Using the regulator system of the invention, the operator need only set the tank pressure regulators to recommended pressures for any given burner tip size. All further adjustment is automatic as he switches the valve levers from low pressure light-up to high pressure jets for preheat, and then to cutting oxygen for cutting. In test operation of a single valve and torch with various tip sizes, the following pressure readings were observed:

| Tip size | Oxygen, p.s.i. | | | Propane, p.s.i. | | |
|---|---|---|---|---|---|---|
| | Tank | Preheat | Low press. | Tank | Preheat | Low press. |
| No. 2 | 30 | 9 | ½–1½ | 77 | 7 | ¼ |
| No. 3 | 35 | 14 | 4–1½ | 88 | 8 | ½ |
| No. 4 | 60 | 17 | 1½ | 99 | 9 | 1 |
| No. 5 | 65 | 19 | 1½ | 13 | 12½ | 1¾ |
| No. 6 | 85 | 25 | 1½ | 14 | 13 | 2 |

In the above tests the tank pressures recorded were the tank regulator pressures, and the remaining pressure readings were taken immediately downstream of the novel valve regulating head. The low pressure readings apply to both the preheat and cutting cycles.

It has been found in comparative operation that torches utilizing the valve regulator head of the present invention afford substantial savings of fuel gas and oxygen relative to conventional torches including both equal pressure standard torches and injection type torches. The invention offers particular advantages in connection with hand torches by providing virtually automatic control of pressure and flow as desired through manual leverage in place of the tedious, and too often neglected, manual adjustment of valve settings.

We claim:

1. In a flame cutting torch which includes a mixing head, a burner tip mounted on said mixing head, separate tubes for delivering fuel gas, combustion oxygen and cutting oxygen to said mixing head and burner tip, a control valve assembly for controlling selectively the flow of said gases which comprises a fuel gas inlet channel, a conduit means adapted to flow fuel gas from the inlet channel to the fuel gas tube, adjustable valve means associated therewith for controlling flow of the gas therethrough, a second conduit means adapted to flow fuel gas at relatively high pressure from the inlet channel to the fuel gas tube, a quick-acting valve in said second conduit means adapted upon actuation to open and thereby increase the flow of fuel gas and resultant pressure in the fuel gas tube, an oxygen inlet channel, a first flow conduit from said oxygen inlet channel to the combustion oxygen tube, adjustable valve means associated therewith for controlling the flow of oxygen therethrough, a second flow conduit from the oxygen inlet channel to the combustion oxygen tube having a quick-acting valve associated therewith and adapted upon actuation to open and thereby increase the flow of combustion oxygen and resultant pressure in the combustion oxygen tube, a third flow conduit means adapted to flow oxygen from the oxygen inlet channel to the cutting oxygen tube, and having a quick-acting valve associated therewith, means for simultaneously actuating the quick-acting valves associated with said fuel gas and combustion oxygen conduits, and means for selectively closing the said quick-acting valves associated with said fuel gas and combustion oxygen conduits while opening the quick-acting valve associated with the cutting oxygen conduit.

2. In a flame cutting torch which includes a mixing head, a burner tip mounted on said mixing head, separate tubes for delivering fuel gas, combustion oxygen and cutting oxygen to said mixing head and burner tip, a control valve assembly for controlling selectively the flow of said gases which comprises a fuel gas inlet channel, a conduit means adapted to flow fuel gas from the inlet channel to the fuel gas tube, adjustable valve means associated therewith for controlling flow of the gas therethrough, a second conduit means adapted to flow fuel gas at relatively high pressure from the inlet channel to the fuel gas tube, a quick-acting valve in said second conduit means adapted upon actuation to open and thereby increase the flow of fuel gas and resultant pressure in the fuel gas tube which comprises a valve chamber, a spring-loaded valve head and an elongated plunger stem, an oxygen inlet channel, a first flow conduit from said oxygen inlet channel to the combustion oxygen tube, adjustable valve means associated therewith for controlling flow of oxygen therethrough, a second flow conduit from the oxygen inlet channel to the combustion oxygen tube having a quick-acting valve associated therewith and adapted upon actuating to open and thereby increase the flow of combustion oxygen and resultant pressure in the combustion oxygen tube, a third flow conduit means adapted to flow oxygen from the oxygen inlet channel to the cutting oxygen tube, and having a quick-acting valve associated therewith comprising a valve chamber, a spring-loaded valve head and an elongated plunger stem, means for simultaneously actuating the quick-acting valves associated with said fuel gas and combustion oxygen conduits, and means for selectively closing the said quick-acting valves associated with said fuel gas and combustion-oxygen conduits while opening the quick-acting valve associated with the cutting oxygen conduit.

3. In a flame cutting torch which includes a mixing head, a burner tip mounted on said mixing head, separate tubes for delivering fuel gas, combustion oxygen and cutting oxygen to said mixing head and burner tip, a control valve assembly for controlling selectively the flow of said gases which comprises a fuel gas inlet channel, a conduit means adapted to flow fuel gas from the inlet channel to the fuel gas tube, adjustable valve means associated therewith for controlling flow of the gas therethrough, a second conduit means adapted to flow fuel gas at relatively high pressure from the inlet channel to the fuel gas tube, a quick-acting valve in said second conduit means adapted upon actuation to open and thereby increase the flow of fuel gas and resultant pressure in the fuel gas tube, an oxygen inlet channel, a first flow conduit from said oxygen inlet channel to the combustion oxygen tube, adjustable valve means associated therewith for controlling flow of oxygen therethrough, a second flow conduit from the oxygen inlet channel to the combustion oxygen tube having a quick-acting valve associated therewith and adapted upon actuation to open and thereby increase the flow of combustion oxygen and resultant pressure in the combustion oxygen tube, a third flow conduit means adapted to flow oxygen from the oxygen inlet channel to the cutting oxygen tube and having a quick-acting valve associated therewith, means including a lever arm and associated means adapted to impose actuating pressure on and simultaneously open both of said quick-acting valves associated with said fuel gas and combustion oxygen conduits, means associated with said lever arm for locking it in the pressure actuating position, means including a second lever arm adapted to impose actuating pressure opening the quick-acting valve associated with said cutting oxygen conduit, and means associated with said levers for releasing the first upon actuation of the second thereof.

4. In a flame cutting torch which includes a mixing head, a burner tip mounted on said mixing head, separate tubes for delivering fuel gas, combustion oxygen and cutting oxygen to said mixing head and burner tip, a control valve assembly for controlling selectively the flow of said gases which comprises a fuel gas inlet channel, a conduit means adapted to flow fuel gas from the inlet channel to the fuel gas tube, adjustable valve means associated therewith for controlling flow of the gas therethrough, a second conduit means adapted to flow fuel gas at relatively high pressure from the inlet channel to the fuel gas tube, a quick-acting valve in said second conduit means adapted upon actuation to open and thereby increase the flow of fuel gas and resultant pressure in the fuel gas tube and which comprises a valve chamber, a spring-loaded valve head and an elongated plunger stem, an oxygen inlet channel, a first flow conduit from said oxygen inlet channel to the combustion oxygen tube, adjustable valve means associated therewith for controlling flow of oxygen therethrough, a second flow conduit from the oxygen inlet channel to the combustion oxygen tube having a quick-acting valve associated therewith and adapted upon actuation to open and thereby increase the flow of combustion oxygen and resultant pressure in the combustion oxygen tube, a third flow conduit means adapted to flow oxygen from the oxygen inlet channel to the cutting oxygen tube, and having a quick-acting valve associated therewith comprising a valve chamber, a spring-loaded valve head and an elongated plunger stem, a lever arm adapted to impose actuating pressure simultaneously opening both of said quick-acting valves associated with said fuel gas and combustion oxygen conduits, a second lever arm adapted to impose actuating pressure opening the quick-acting valve associated with said cutting oxygen conduit, and means associated with said levers for releasing the first upon actuation of the second thereof.

5. In a flame cutting torch which includes a mixing head, a burner tip mounted on said mixing head, separate tubes for delivering fuel gas, combustion oxygen and cutting oxygen to said mixing head and burner tip, a control valve assembly for controlling selectively the flow of said gases which comprises a fuel gas inlet channel, a conduit means adapted to flow fuel gas from the inlet channel to the fuel gas tube, adjustable valve means associated therewith for controlling flow of the gas therethrough, a second conduit means adapted to flow fuel gas at relatively high pressure from the inlet channel to the fuel gas tube, a quick-acting valve in said second conduit means adapted upon actuation to open and thereby increase the flow of fuel gas and resultant pressure in the fuel gas tube and which comprises a valve chamber, a spring-loaded valve head and an elongated plunger stem, an oxygen inlet channel, a first flow conduit from said channel to the combustion oxygen tube, adjustable valve means associated therewith for controlling flow of oxygen therethrough, a second flow conduit means from the oxygen inlet channel to the combustion oxygen tube having a quick-acting valve associated therewith and adapted upon actuation to open and thereby increase the flow of combustion oxygen and resultant pressure in the combustion oxygen tube, a third flow conduit means adapted to flow oxygen from the oxygen inlet channel to the cutting oxygen tube, and having a quick-acting valve associated therewith comprising a valve chamber, a spring-loaded valve head and an elongated plunger stem, a lever arm adapted to impose actuating pressure simultaneously on the plunger valve stems of both of the quick-acting valves associated with said fuel gas and combustion oxygen conduits thereby opening said valves, means for locking the lever in the actuating position, a second lever arm adapted to impose actuating pressure on the plunger valve stem of the quick-acting valve associated with the cutting oxygen conduit, and a third lever arm mounted between said first and second levers whereby actuating pressure on the second of said levers acts to simultaneously unlock the first of said levers from the actuating position.

References Cited in the file of this patent
UNITED STATES PATENTS

| | | |
|---|---|---|
| 1,771,511 | Quelch | July 29, 1930 |
| 2,095,751 | Kirk et al. | Oct. 12, 1937 |
| 2,473,465 | Betz | June 14, 1949 |
| 2,622,668 | Buckle | Dec. 23, 1952 |